UNITED STATES PATENT OFFICE.

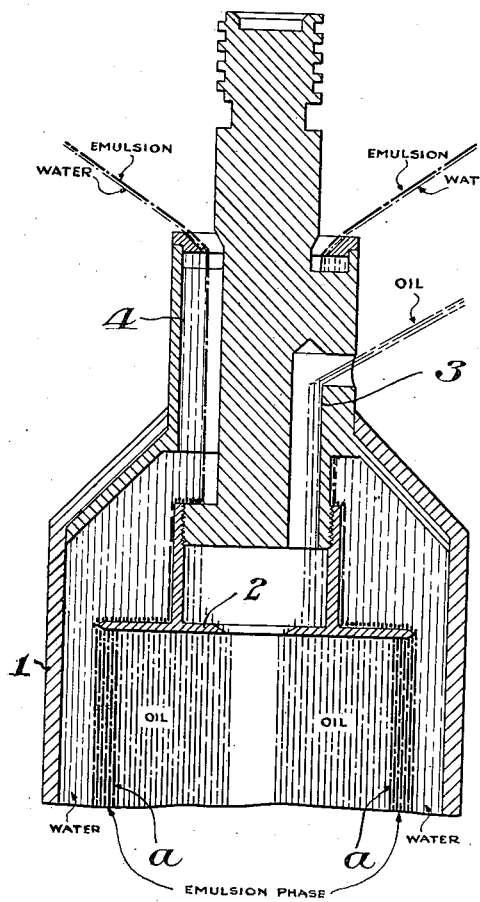
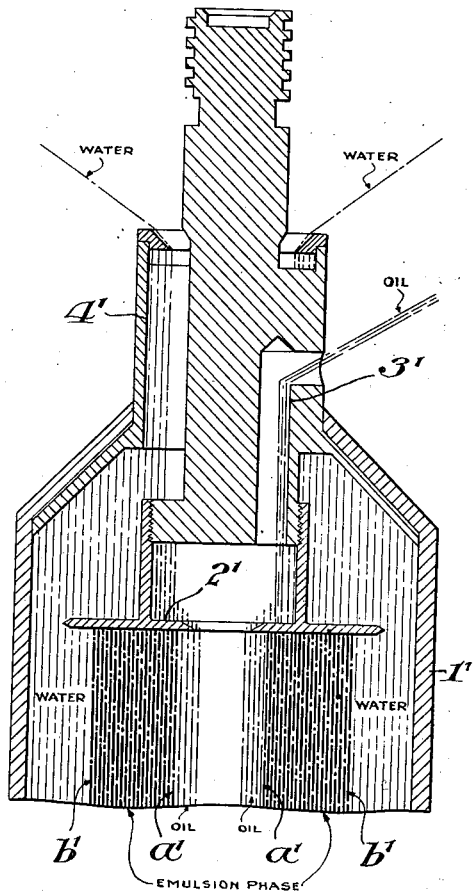

PHILIP T. SHARPLES, OF ST. DAVIDS, PENNSYLVANIA.

METHOD OF RESOLVING EMULSIONS.

1,373,773.  Specification of Letters Patent. Patented Apr. 5, 1921.

Application filed October 21, 1918. Serial No. 259,107.

*To all whom it may concern:*

Be it known that I, PHILIP T. SHARPLES, a citizen of the United States, residing at St. Davids, in the county of Delaware and State of Pennsylvania, have invented Methods for Resolving Emulsions, of which the following is a specification.

My invention relates to the treatment of oil emulsions, particularly where oil and water occur in several phases, for the purpose of resolving such emulsions.

Crude petroleum, as it commonly occurs in the oil fields, comprises a continuous phase of oil which may be referred to as "free oil," a water phase of comparatively low dispersity which may be referred to as "free water," and a phase of higher dispersity comprising an emulsion of oil and water in which water is discontinuous which may be referred to as "B. S."

Some emulsions, for instance the so called "tank bottoms" or "B. S.," may be more complex, having water as a primary continuous phase and an emulsion of oil and water as the primary disperse phase, the latter comprising oil as a secondary continuous phase with water as the secondary disperse phase.

It is the primary object of my invention to resolve such emulsions rapidly and efficiently.

A desideratum attained is the economical resolution of emulsions in large volumes.

The method, as applied to the treatment of crude petroleum, comprises the centrifuging of the emulsion in such manner that the oil is or may be discharged with less than two per cent. of the emulsion phase (this being the usual requirement for pipe line petroleum), and the free water and the emulsion phase are discharged together with resulting enlargement of the size of the globules of water in the emulsion phase and reduction of the stability of the emulsion phase. Thus the emulsion phase is efficiently removed from the bulk of the oil without necessarily removing all of the primary oil phase from the emulsion phase, but generally discharging some free oil with the emulsion phase to facilitate its resolution as accomplished in the next steps.

The discharged mixture of water and emulsion phase is preferably heated, and may be treated further for the reduction of its stability, after some or all of the free water has been removed, as by passing it through salt water or adding soap thereto.

The material, thus treated, is subjected to subsidence by centrifuging for the purpose of resolving it into oil and water or this separation may be effected in some instances to subsidence by gravity.

The accompanying drawings illustrate diagrammatically effects obtained by the application of the centrifuging forces according to my method, Figure 1 representing a vertical sectional view of a bowl top with the free oil separated from the free water and emulsion phase in accordance with the first centrifuging operation specified; and Fig. 2 representing a vertical sectional view of a bowl top with the free oil and water separating from the emulsion phase in accordance with the second centrifuging operation specified.

As illustrated in Fig. 1, the bowl 1 has in the top thereof a ring or open circular baffle 2, and is provided with the outlet 3 communicating with the interior of the bowl over the inner edge of the ring and the outlet 4 communicating with the interior of the bowl over the outer edge of the ring, the ring and the discharge outlets being placed in such relation to the bowl's axis of rotation that a large body of separated oil will be held in the bowl, such body extending for instance to the zone *a* or as near as practicable to the outer edge of the ring without interference with the desired discharge of practically all of the free oil over the inner edge of such ring and without effecting the discharge of a substantial or undesired amount of free oil over the outer edge of the ring with the free water and emulsion.

The result of this arrangement is that the free oil has the free water and emulsion phase separated therefrom efficiently by reason of the high degree of centrifugal force to which such free oil is subjected before it is discharged, and the stability of the emulsion phase is lowered by the centrifugal force to which it is subjected, as also by the presence of some free oil discharged therewith. The depth radially of the free oil will be substantially greater than the distance therefrom to the outer edge of the baffle or the place of initial discharge of the emulsion phase and water.

This emulsion phase, either with or after separation from the free water and after such intermediate treatment as by heat and salt or soap as its character may render desirable, is then subjected to centrifuging in a second machine having the ring or baffle 2' and the outlets 3' and 4' so proportioned and placed with relation to the axis of rotation of the bowl 1' that the discharge of unresolved emulsion phase or B. S. will be baffled, the place of division $a'$ between the discharging separated oil and emulsion phase being comparatively close to the inner edge of the baffle and the place of division $b'$ between the discharging separated water and the emulsion phase being comparatively close to the outer edge of the baffle, the separated free oil occupying a much smaller portion of the bowl in the second than in the first centrifuging step and the emulsion phase occupying a comparatively wide zone and being subject to a high degree of centrifugal force to effect further resolution thereof.

The steps described may be applied in whole or in part to the treatment of other unrefined or crude oils, such as cotton seed oil, for effecting its separation into constituent parts, and it will be understood that the operations are not to be restricted excepting as required by the limitations of the claims.

Having described my invention, I claim:—

1. The method of treating an emulsion comprising three phases which consists in centrifuging the same so as to effect separation with the discharge of the lightest phase separately from the heavier phases, retarding the discharge of said lightest phase so as to hold a relatively large volume thereof in the centrifuge, and subjecting said volume to the highest centrifugal force practicable without discharging a substantial amount thereof with said heavier phases.

2. The method of treating a liquid or semi liquid comprising three phases which consists in centrifuging the same so as to effect separation with the discharge of the intermediate with the heaviest phase and baffling the discharge of said phases so as to effect their initial mechanical division at substantially different radial distances from the axis of rotation and retain a volume of said lightest phase having a greater depth radially than the distance therefrom radially to said place of mechanical division of the other phases.

3. The method of treating a liquid or semi liquid comprising an emulsion of oil and water which consists in centrifuging and baffling the same so as to separate the bulk of the free oil and lower the stability of the remaining emulsion and then resolving said separated emulsion by subsidence.

4. The method of resolving complex emulsion comprising three or more phases which consists in centrifuging and baffling said emulsion so as to recover substantially all of the lightest phases separately from the heavier phases together with reduction of the stability of the emulsion comprising an intermediate phase and then resolving the intermediate phase by centrifugal subsidence.

5. The method of resolving an emulsion comprising a light phase, a heavy phase, and an intermediate emulsion phase, which consists in centrifuging said emulsion first named so as to recover substantially all of the lightest phase separately and the heaviest with the intermediate emulsion phase and to reduce the stability of said intermediate emulsion phase, treating said intermediate emulsion phase for the further lowering of its stability, and resolving the treated emulsion phase by centrifuging.

6. The method of resolving an emulsion comprising a light phase, a heavy phase and an intermediate emulsion phase which consists in centrifuging said emulsion first named so as to recover substantially all of the lightest phase separately and the heaviest with the intermediate emulsion phase, heating the separated intermediate emulsion phase to reduce its stability, and then resolving the treated emulsion phase by centrifuging.

7. The method of resolving an emulsion comprising a light phase, a heavy phase and an intermediate emulsion phase which consists in centrifuging said emulsion first named so as to effect the separation of the bulk of the lightest phase from the heaviest and the intermediate emulsion phase, treating said intermediate emulsion phase with a chemical agent adapted to reduce its stability, and resolving the treated emulsion phase by centrifuging.

8. The method of resolving an emulsion comprising a light phase, a heavy phase and an intermediate emulsion phase which consists in centrifuging said emulsion first named so as to effect the separation of the bulk of the lightest phase from the heaviest and intermediate emulsion phase, heating and chemically treating the separated intermediate emulsion phase, and resolving the treated emulsion phase by centrifuging.

9. The method of treating an emulsion which consists in centrifuging and baffling the same so as to effect the separation and initial discharge of the lightest and heaviest phases at substantially different radial distances from the axis of rotation and holding unresolved emulsion forming the bulk of the liquid in the top of the bowl between the places of discharge of said heaviest and lightest phases.

In testimony whereof I have hereunto set my name this 19th day of October, 1918.

P. T. SHARPLES.